United States Patent [19]

Conaway

[11] Patent Number: 4,942,750

[45] Date of Patent: Jul. 24, 1990

[54] APPARATUS AND METHOD FOR THE RAPID ATTAINMENT OF HIGH HYDROSTATIC PRESSURES AND CONCURRENT DELIVERY TO A WORKPIECE

[75] Inventor: Robert M. Conaway, Columbus, Ohio

[73] Assignee: Vital Force, Inc., Columbus, Ohio

[21] Appl. No.: 338,222

[22] Filed: Jan. 23, 1989

[51] Int. Cl.$^5$ ............................................. B21P 26/10
[52] U.S. Cl. ...................................... 72/56; 264/566;
     264/570; 219/7.5; 29/421.1; 419/68; 419/42
[58] Field of Search ........................ 264/28, 570, 566;
     219/7, 5, 271–276; 419/38, 39, 42, 49, 66, 68;
     29/421 R; 72/56, 57

[56] References Cited

U.S. PATENT DOCUMENTS

| | | | |
|---|---|---|---|
| 3,054,147 | 9/1962 | Archibald | 419/42 |
| 3,198,927 | 8/1965 | Stinger | 219/7.5 |
| 3,551,946 | 1/1971 | Backer et al. | 419/68 |
| 3,760,599 | 9/1973 | Bose | 264/28 |
| 3,797,294 | 3/1974 | Roth | 72/56 |
| 4,061,139 | 12/1977 | Kauffmann | 72/56 |
| 4,619,129 | 10/1986 | Petkou et al. | 72/56 |

FOREIGN PATENT DOCUMENTS 1135853  9/1962  Fed. Rep. of Germany .......... 72/56

*Primary Examiner*—David Jones
*Attorney, Agent, or Firm*—George Wolken, Jr.

[57] ABSTRACT

Apparatus and methods are disclosed for the rapid generation of high hydrostatic pressures and the concurrent delivery of said pressures to a workpiece. The apparatus and methods comprise the rapid thermal expansion and vaporization of a volatile fluid. The volatile fluid is typically liquid argon and heated typically by means of a controllable electric heater, delivered to the workpiece typically by means of a pressure-rupturable membrane. The disclosed apparatus and methods permit the application of high hydrostatic pressures to commercial-scale workpieces, in an economic manner and with reduced cycle times.

3 Claims, 2 Drawing Sheets

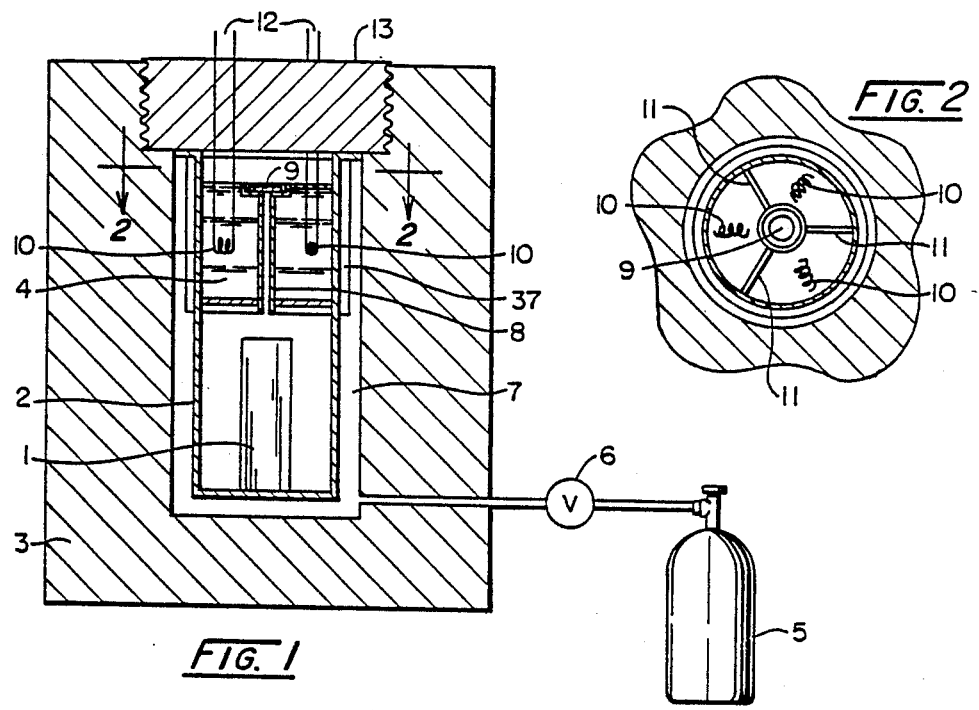
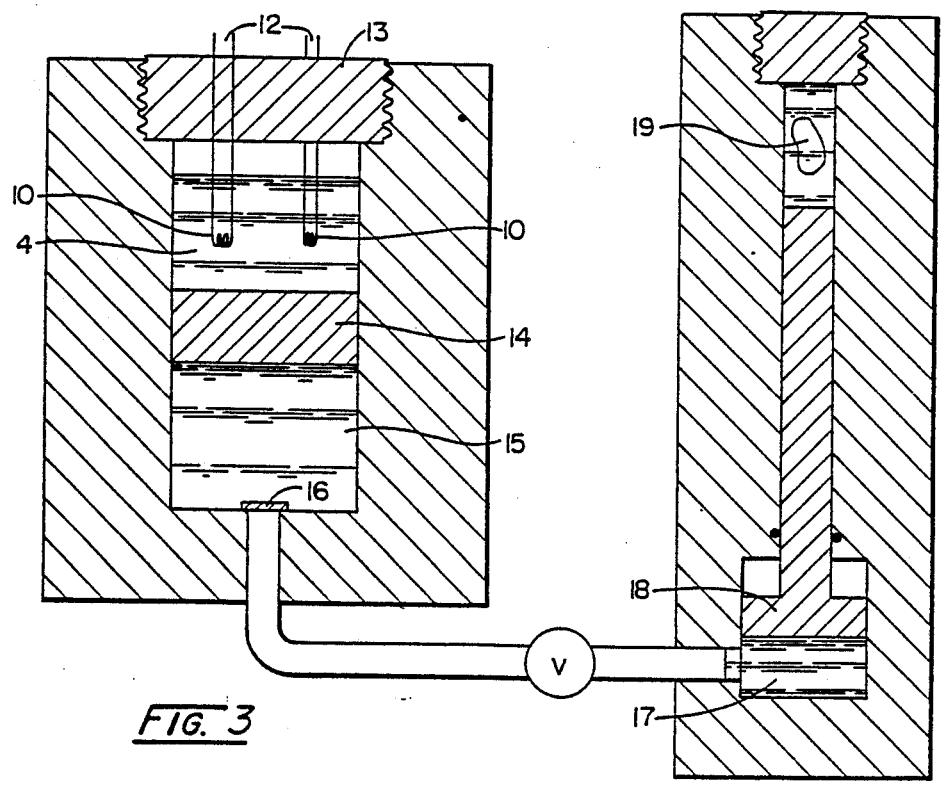

APPARATUS AND METHOD FOR THE RAPID ATTAINMENT OF HIGH HYDROSTATIC PRESSURES AND CONCURRENT DELIVERY TO A WORKPIECE

This application is derived from U.S. Pat. application ser. no. 07/060,518, filed Jun. 7, 1987 and issued as U.S. Pat. No. 4,856,311 on Aug. 15, 1989 and shares common ownership therewith.

BACKGROUND OF INVENTION

This invention relates generally to the field of high pressure technology and more particularly to apparatus and methods for the rapid attainment of high hydrostatic pressures for concurrent use in processing workpieces. More specifically, this invention relates to apparatus and methods for processing various workpieces of a metallic and nonmetallic nature at high hydrostatic pressures with improved cost efficiency for the generation and use of such pressures.

This invention also relates to an apparatus and method for obtaining high hydrostatic pressures of oxygen, or other chemically reactive fluids, without the use of special pumps for the attainment of said high pressures, and without the need to pass said reactive fluids at high pressure through valves, with the accompanying problems of chemical attack.

Considerable effort is presently expended in the design, manufacture, engineering and utilization of advanced materials. As the technological demands of modern society increase, so too does the need increase for superior materials meeting these requirements. A vital component in the development of new materials is the development and economic use of processes which improve the properties of otherwise inadequate materials. Such processes, and the associated equipment for carrying them out, are the subject of the present invention.

One of the major methods for processing materials to achieve improved performance involves the application of high pressures, frequently (but not always) in conjunction with high temperatures. For example, increasing commercial applications are appearing for the products of "powder metallurgy". This technology involves the processing of one or more powdered components including specific metals in specific amounts to form solid components of superior performance. Typically, such powdered materials are compressed under high pressure (often in conjunction with high temperature), to produce a solid metal material with the desired properties.

Other applications of high pressure involve "hot isostatic pressing" ("HIP") in which heat and pressure are applied to a variety of materials (metals and nonmetals) to achieve a variety of ends. The field of HIP is so diverse that here we can only describe a few of the salient applications. For example, many metals fabricated by conventional metal-forming technology have voids or spaces within the structure of the fabricated material. That is, the piece as fabricated does not possess the full density of the material itself. HIP is commonly used in the "densification" of such materials to remove potentially harmful voids. Densification need not be confined to the processing of metals, as many plastic, ceramic and composite materials also form voids in fabrication. The densification by HIP (or sometimes by pressure alone without the use of heat) is an emerging technology for improving the properties of such nonmetals also.

Another common application of HIP technology is in the formation of bonds between materials which are difficult or impossible to join by any other technique. HIP has successfully bonded surface claddings of costly, high performance materials onto relatively inexpensive substrates, achieving thereby considerable increase in performance at a relatively modest addition in cost. More applications of HIP in surface cladding, alloying and joining are being reported all the time.

Because of the commercial importance of high pressure processing of various materials described above, considerable research and engineering has gone into the development of economical processes and equipment for the attainment of the high hydrostatic pressures required in such processes. There are a number of problems to be considered. For example, many of the workpieces requiring the application of high pressure are large. Components of jet aircraft engines are a typical example of reasonably large workpieces (several feet) requiring high pressure processing. Such jet engine components are currently receiving HIP processing, since the advantages of HIP processing for such costly pieces outweigh the difficulties of making HIP equipment for processing large-volume workpieces.

In addition to the example of jet aircraft engines, there are many potential areas for high pressure processing of bulk steels and other materials of major potential commercial application. Such processes are well studied in the laboratory and known to produce very favorable results. The barrier to commercialization has been the lack of a technology for applying high pressures to such large samples at a commercially acceptable price.

The technical and patent literature abound in references to high pressure equipment and processes which have not, and cannot, be applied to the large specimens of industry at reasonable costs. It is a major goal of the present invention to describe a technology which does lend itself to the processing of commercial-size workpieces at acceptable costs.

Another problem associated with the commercial high pressure processing of large samples is the cost of the process. Industry must deal with a fundamental dilemma in processing large workpieces. To apply high pressures to a large volume, the cost of the pressure-producing equipment is typically quite large. To lower the costs of capital equipment, high pressure equipment is typically purchased which attains the high pressures only slowly. That is, the equipment is the smallest (and cheapest) which does the job but, of necessity, it does the job slowly. Thus, the workpieces to be processed must first await the attainment of high pressure, receive the required processing time at that pressure, and then exit the machinery. The slow attainment of high pressure markedly slows down many processes, reducing the number of workpieces that can be processed each day, and inherently driving up the effective cost of processing each piece. The conventional solution to such problems of "cycle time" is to use pressure equipment having excess capabilities, well above that required for the job at hand. Such over-capacity can achieve the working pressure much more quickly and, therefore, reduce the cycle time for each piece to be processed. However, the cost of the equipment is typically very much increased, also adding to the effective cost of each processed workpiece. The way out of this commercial dilemma is to look for methods and equipment for the rapid application of high pressure to large, commercial-size workpieces at a reasonable cost. Such is the subject of the present invention.

The present invention involves the rapid generation of high pressure by the thermal expansion and/or vaporization of a fluid. The basic procedures for expanding a fluid or vapor to produce high pressure has been known for at least 300 years since the time of Boyle. Likewise, rapid thermal expansion (as in an explosion) has been used many times to generate high pressures rapidly. The trick has been to achieve high pressures sufficiently rapidly to reduce cycle times; be able to maintain the hydrostatic pressures long enough to complete the process cycle; and apply such pressures to a sufficiently large volume to have commercial applications, as opposed to laboratory use; yet do all this at a reasonable cost for each workpiece processed. The development of such equipment and processes is the subject of the present invention.

We cite two typical examples from the recent patent literature for other approaches to the generation of high pressure. Estanislao (U.S. Pat. No. 4,251,488) claims to use the thermal expansion of a fluid to produce diamonds. The commercial production of diamonds is a well-established, price competitive industry using many techniques for attaining the required high pressures, of which we presume that of Estanislao is one. The reasons for the existence of several competitive technologies, we submit, is that the techniques for achieving pressures to manufacture diamonds need not be applied to large volumes. The diamond-producing process typically applies high pressure to a volume of the order of several cubic inches; quite adequate for the production of diamonds, but not for the processing of large, less-costly materials, such as steels. A way to produce high pressures economically for large volumes would have only a modest effect on the production of diamonds, but would require a novel approach to the design of the required equipment. This is one of the subjects of the present invention.

The patent of Stinger (U.S. Pat. No. 3,198,927) discloses a method for the attainment of high pressure by the rapid release of electrical energy in an expandable fluid. This is also the underlying technique used in the present invention for the rapid attainment of high pressure. As we note above, the input of heat energy to a fluid in whatever form at whatever speed has been known for many decades (centuries in some cases). However, the apparatus used by Stinger is different from that disclosed here in numerous particulars such as the use of shock waves, exploding wires and magnetic pinch effects (not needed by the present invention), and others which would be quite difficult to apply economically to the processing of large-volume workpieces. We submit, the present invention represents a practical, cost-effective approach to the reduction of cycle times for commercial-size workpieces requiring the application of high hydrostatic pressures.

There has been considerable recent attention given to the possibility of producing 'high temperature' superconductors; that is, materials whose superconducting transition temperature is much higher than previously achieved. An important commercial goal has been to achieve in practical materials superconducting transition temperatures as high as the boiling point of nitrogen: $-195.8$ deg. C. At the present time, many of the leading candidate materials for high temperature superconductors are various metal-oxides produced according to careful chemical procedures. Typically, a precursor ceramic-type material is synthesized according to well-known methods of inorganic chemistry. Following this synthesis, additional oxygen is typically reacted with the precursor ceramic to produce the required stoichiometry. In some cases, this results in the formation of favorable superconducting compounds.

Typical laboratory oxygenation reactions are carried out under elevated pressures and controlled temperatures, frequently in the presence of an oxygenation catalyst. To scale-up such reactions to commercial sizes typically requires the handling of large quantities of high-pressure oxygen, frequently at elevated temperatures. Such material is very prone to attack chemically any pumps, valves, etc. with which it comes into contact. The present invention offers an economically attractive way to handle high-pressures of reactive species (such as oxygen) on a commercial scale, while eliminating the need to pump such materials to high pressures and pass it through valves subject to chemical attach."

SUMMARY AND OBJECTS OF THE INVENTION

The present invention relates to apparatus and procedures for the rapid production of high hydrostatic pressures using the expansion and/or vaporization of a fluid in combination with the efficient application of the pressures thereby generated to workpieces of various metallic or nonmetallic materials.

A primary object of the present invention is to provide apparatus for the rapid production of high pressures.

Another object of the present invention is to provide apparatus for the rapid application of high pressures to workpieces along with the application of high temperatures to said workpieces, with the application of heat preceeding, concurrent or subsequent to the attainment of said high pressure.

A further object of the present invention is to provide apparatus for the rapid application of high pressures to workpieces along with the application of cryogenic temperatures, with the attainment of cryogenic temperatures preceeding, concurrent or subsequent to the attainment of said high pressure.

A further object of the present invention is to provide apparatus for the rapid expansion and/or vaporization of a fluid by the sudden introduction of electrical energy.

Another object of the present invention is to produce high hydrostatic pressures without the use of mechanical pumps to create such pressures, and without the use of valves to release such pressures.

Yet a further object of the present invention is to produce high hydrostatic pressures of large volumes of chemically reactive fluids, an example of which is oxygen.

Yet another object of the present invention is to provide apparatus for the rapid application of high pressure to commercial-scale workpieces, suitable for use outside the laboratory.

A further object of the present invention is to provide apparatus and methods for the reduction of the cycle time in high pressure processing of metals and other materials.

Yet another object of the present invention is to provide apparatus and methods for the high temperature and high pressure processing of workpieces with reduced cycle times.

A further object of the present invention is to provide a procedure for the rapid processing of materials by high temperature and high pressure with reduction in the cycle time for the processing of each workpiece.

DESCRIPTION OF DRAWINGS

FIG. 1. A cross-sectional view of a typical pressure vessel containing the pressure-generating fluid, the heating elements and the workpiece to be processed, as would typically be applicable for high temperature processing.

FIG. 2. An elevated cross-sectional view of FIG. 1 along section 2.

FIG. 3. A cross-sectional view of a typical apparatus for the rapid application of high pressures, in a typical configuration for use at cryogenic temperatures.

DESCRIPTION OF PREFERRED EMBODIMENTS

Figure 4:
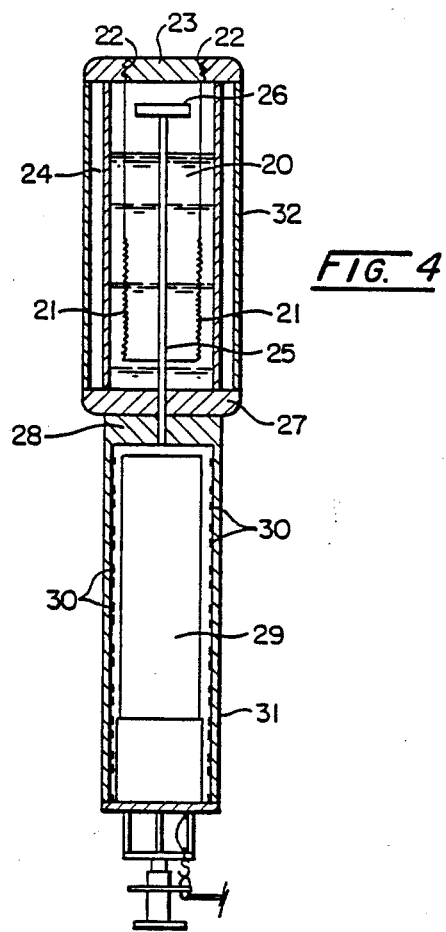
FIG. 4. A cross-sectional view of a typical high pressure, high temperature processing apparatus as it would typically appear with detachable workpiece chamber and pressure-generating chamber.

We describe here three typical embodiments of the rapid pressurization apparatus which is a major part of the present invention. The various embodiments are intended to demonstrate particular advantages for each and, therefore, each may be favored for certain applications. The presentation of these particular embodiments is intended to provide the typical apparatus for the practice of the present invention as presently understood, and obvious modifications or extensions of the basic equipment described here will be clear to persons of ordinary skill in the art.

FIG. 1 shows in cross-sectional view a typical high pressure apparatus according to one embodiment of the present invention. The workpiece to which pressure is to be applied, 1, is placed inside a chamber surrounded by a thermal insulating barrier, 2, and the entire assembly is surrounded by a suitable pressure containment vessel, 3. The chamber containing the workpiece to be processed is surmounted by a second chamber into which a suitable expansible fluid, 4, is introduced. Typically, the fluid is chosen as the liquid phase of a chemically nonreactive species such as nitrogen, argon or other inert material typically a gas at room temperature. This fluid is typically introduced at very low temperature in a liquid form into the containment vessel from a suitable storage tank, 5, by means of valve 6. Typically, a space, 7, is provided between the thermal barrier 2 and the pressure containment vessel 3 to allow for simple introduction of the fluid to the upper chamber. In order to prevent rapid evaporation of fluid 4, the upper chamber is typically surrounded by a vacuum insulating barrier, 37, in addition to the thermal barrier, 2.

Reactive fluids, such as oxygen, may also be used if care is taken to insure that these fluids come into contact only with materials impervious to attack. For the example of oxygen as a typical reactive fluid, this means that the interior of the vessels be made from (or coated with) nonreactive substances such as platinum, chromium, nickel-based platinum, aluminum oxide, iron-chrome-aluminum alloys, certain oxides or ceramics, or other materials immune to attack by oxygen under the operating conditions used. Such materials suitable for use with oxygen or other reactive fluids at, typically, high temperatures, are well known to chemists and engineers working in the field. It is important to note, however, that the reactive fluid need not be pumped at high pressure if the present invention is employed, thereby avoiding the engineering problems in the design and use of such pumps.

The upper chamber in FIG. 1 is typically provided with a tube, 8, connecting the upper chamber with the lower chamber, penetrating the thermal barrier as well as the vacuum wall. Tube 8 is typically topped by a rupture disc, 9, typically constructed of metal of suitable thickness to rupture when the pressure in the upper chamber has risen to a suitable critical value. Typically, the apparatus of FIG. 1 will be provided with electric heaters, 10, immersed in said fluid 4, to provide for the introduction of sufficient heat to vaporize said fluid and attain the desired operating pressures in the desired times.

FIG. 2 shows the cross-sectional elevated view through section 2 of the apparatus of FIG. 1. There will typically be a plurality of heating elements, 10, immersed in the fluid 4, and certain structural supports, 11, are typically provided for the walls of the container. The electrical heating elements 10 are connected to their current source by electrical feeds, 12, passed through the pressure seal, 13, typically a threaded plug designed to withstand the operation conditions of the apparatus.

The apparatus of FIG. 2 is intended for opera ion at high pressure and high temperature. The operating fluid, typically liquid argon, is introduced into chamber 4 following the introduction of the workpiece 1 into the lower chamber. The electrical connections are made, and the pressure seal 13 put into place. When the operating temperature of the workpiece is obtained (typically by means of independent electric heaters, not shown in FIG. 1), electric current is passed through the electrical heating elements, 10, causing liquid, 4, to vaporize, rupturing the rupture disc, 9, and applying high pressure to workpiece 1. For the typical case of liquid argon as the working fluid, approximately 10,000 joules of energy must be deposited in the liquid argon (at 90 deg. K.) to attain a pressure of 2000 atm applied to the workpiece (at 500 deg. K.). The heat applied to the workpiece is typically supplied by standard furnace technology common in the art of HIP process, and not shown in FIG. 1.

As noted above, the present apparatus is easily modified to utilize chemically reactive working fluids such as oxygen. The release of high pressure oxygen through a valve following completion of the process creates severe problems of chemical attack on the valve. The present equipment and method requires no such valve, simply the removal of heat, to reduce the pressure to managable levels upon completion of the process.

The typical apparatus shown in FIGS. 1 and 2 is intended for use in applying both high pressure and high temperature to the workpiece 1. It is not the preferred apparatus when the workpiece is to be subjected to low temperatures along with high pressures. Attempts to use the apparatus of FIGS. 1 and 2 to apply high temperatures to workpiece 1 while said workpiece is held at low temperatures will typically result merely in the fluid, 4, from the upper chamber condensing on the (assumed cold) walls of the lower, workpiece chamber, 2. The desired rapid attainment of high pressures will thus not be obtained.

An alternative embodiment which may be used for the rapid application of high pressures and low temperatures is shown in FIG. 3. Typically, electric heating elements, 10, are again immersed in a volatile fluid 4, and connected to a typical power source by means of leads, 12, through the pressure plug, 13.

High pressure is typically generated by the rapid introduction of electrical energy to heating elements, 10. This pressure is exerted on a transmitting medium (typically an inert, non-volatile fluid, such as a hydrocarbon), 15, by means of a movable plug, 14. The pressure-transmitting medium, 15, is typically in contact with a rupture disc, 16, to enable the pressure to rise to a suitable critical value before application of said pressure to the workpiece begins. In typical operation, upon rupture of the rupture disc, 16, pressure is rapidly transmitted to fluid reservoir 17. Typically, this pressure is exerted on a pressure enhancing structure, 18, comprising typically a movable piston with the area facing fluid 17 larger than the area of the surface applying pressure to workpiece 19. The pressure applied in 17 will be enhanced in region 19 by the ratio of the areas of the piston 18 facing region 17 and the area of the piston face in region 19, according to the well-known principle of Archimedes.

The apparatus of FIG. 1 and 2 is capable of applying high pressure to a workpiece, 1 in a much more rapid fashion that possible with typical mechanical vacuum pumps of reasonable size and cost. Also, the application of pressures to workpiece 1 may typically be performed for even rather large workpieces. While the application of pressures by the expansion of a fluid is well known (as described above), the particular apparatus here possesses in combination the ability to apply such high pressures rapidly (limited only by the speed of electrical heating), and to large samples (limited only by the amount of fluid vaporized). Typically, the vaporization of the fluid will be carried out by means of a pre-charged electrical storage system (typically capacitors, storage batteries or a homopolar generator), and the power dumped into heating coils, 10, rapidly enough to cause the desired pressure rise in the desired time.

FIGS. 1 and 2 show a typical high pressure apparatus in which the workpiece is integrally connected in the same chamber with the fluid. In some applications (typically involving the sequential processing of many workpieces) it is convenient to have the pressure-producing apparatus detachable from the chamber containing the workpiece. The separation of these two chambers allows the workpiece to be brought to the correct temperature for processing separate from the "charging" of the pressurization chamber with the volatile pressure-producing fluid. A typical embodiment of such a "detachable" apparatus is shown in cross-sectional view in FIG. 4.

A fluid (typically liquid argon, but alternatively high pressure gaseous argon at approximately liquid density) is introduced into chamber, 20, and, typically, electrical heating elements, 21, are inserted and connected to the required power source by means of leads, 22, through the high pressure seal, 23. To reduce the loss of cryogenic fluid, the upper chamber is typically surrounded by a vacuum wall, 24, in much the manner of a typical Dewar storage vessel.

As in the previous embodiment, the present device is typically equipped with a connecting tube, 25, surmounted by a rupture disc, 26. The connecting tube, 25, passes through the lower (typically insulated) wall, 27, of the vessel and through the upper pressure wall, 28, of the lower vessel containing the workpiece, 29. In a typical configuration, the pressure-producing fluid and heating elements are mounted above the workpiece allowing gravity to hold the volatile fluid in place at the bottom of the upper vessel prior to electrical vaporization and rupture of the rupture disc, 26.

The lower chamber containing workpiece 29 will typically contain heating elements, 30, on the wall of the pressure containment vessel, 31.

Figure 5:
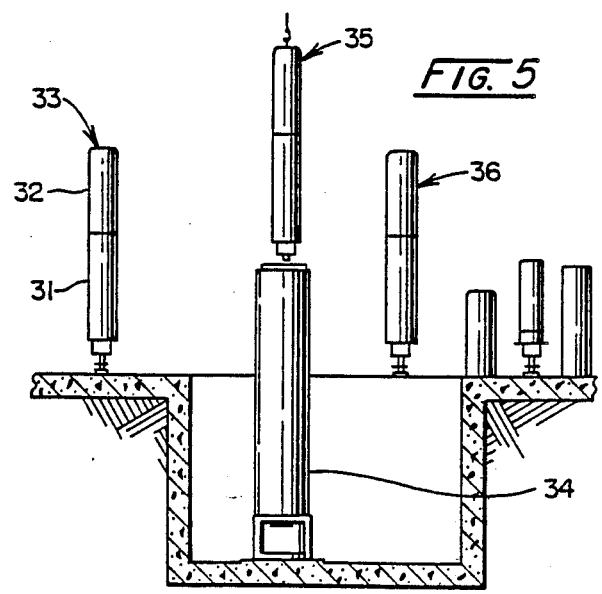
FIG. 5. A perspective view of a typical high pressure processing line, showing typical stations in the processing procedure.

In typical operation, the workpiece is placed into pressure vessel, 31. The vessel, 31, is surmounted by vessel, 32, and the entire assembly is brought into condition for application of pressure. If the particular process to be carried out permits (as many do) the application of high temperature prior to application of high pressure, the workpiece, 29, can be brought to the required temperature at location, 33, in FIG. 5. This method of operation allows workpiece, 29, to attain the required temperature without the introduction of fluid (typically liquid argon) and without the need for confinement in a pressure vessel.

When the workpiece has reached a condition ready for the application of pressure, the entire assembly of two vessels is typically placed into a pressure containment chamber, 34. In typical operation, the vessels 31 and 32 will be thermally insulating but will lack the ability to withstand the full application of the required operating pressures. Placing the assembly in pressure containment vessel, 34, with a sufficiently snug fit and pressure containing upper plug, will insure safe containment of the required pressures, but yet permit relatively thin walls to be used in vessels 31 and 32.

The assembly, 35, is typically introduced into the pressure containment vessel, 34, and the high pressures attained, typically by the rapid introduction of electrical energy. The workpiece can be held at the required temperature and pressure in vessel 34, or alternatively (if the vessels 31 and 32 have been so constructed), removed from vessel 34 and held in a "holding-station" 36, thereby allowing other parts to be processed in vessel 34 at a savings in the usage of the pressure vessel, 34.

Following the entire processing cycle, the chambers containing the workpiece and the electrical assemblies (31 and 32 respectively) are typically separated and prepared for reuse. The result of this alternative embodiment is to allow separate usage for the various vessels and use high pressure and high temperature equipment and containment devices for no longer than necessary. That is, the pressure-producing chamber need not sit idle while the workpiece attains the required temperature, and pressure-containment vessels need not sit at normal atmospheric pressures waiting for temperature stabilization or (typically) "charging" of the upper chamber with liquid argon. The resultant savings in equipment usage can have a significant savings in industrial-scale processing of materials.

I claim:

1. A method for the processing of a workpiece with high temperatures and high pressures comprising the steps:

(a) placing said workpiece into a first thermally insulated chamber, wherein said first chamber has a means therein for heating said workpiece in a controlled manner;

(b) heating said workpiece in said first chamber to the desired temperature;

(c) concurrently with step b, inserting into a second thermally insulated chamber, a heating means in thermal contact with a sufficient quantity of expansible fluid to cause a pressure rise upon expansion in said first chamber and said second chamber to the desired processing pressure for said workpiece, wherein said expansible fluid causes a chemical reaction when in contact with said workpiece, inducing chemical changes in said workpiece;

(d) joining said first and said second chambers by means of a hollow connecting tube, said tube having an impermeable pressure-opening inlet device isolating said first and said second chambers;

(e) inserting said first and said second chambers, as joined in step d, into a pressure-containment vessel;

(f) introducing sufficient heat into said heating means to open said inlet device and raise the pressure in both chambers to the desired value, bringing said expansible fluid into contact with said workpiece, causing thereby chemical changes to occur in said workpiece;

(g) holding the combination of said first and said second chambers, as connected, at the required temperature and pressure for the required length of time;

(h) reducing said pressure;

(i) removing said combination of said first and said second chambers from said pressure-containment vessel;

(j) reducing the temperature of said workpiece and removing said workpiece from said first chamber.

2. A method for processing a workpiece as in claim 1 wherein said expansible fluid is oxygen.

3. An apparatus for the production and delivery to a workpiece of high levels of static pressure comprising:

(a) a first chamber, thermally insulated from its surroundings, wherein said workpiece is placed;

(b) a second chamber directly adjacent to said first chamber thermally insulated therefrom, and thermally insulated from other surroundings of said second chamber, said second chamber connected to said first chamber by means of a hollow connecting tube, said connecting tube blocked to the passage of gas and fluid by means of a pressure-opening inlet device;

(c) a means for the introduction of an expansible fluid into said second chamber, wherein said expansible fluid comprises cryogenic liquid argon, cryogenic liquid nitrogen, cryogenic liquid oxygen, or high pressure gas at approximately liquid density;

(d) a means for rapidly heating and expanding said fluid, attaining thereby pressure in excess of that required to open said inlet device, transmitting thereby said pressure to said first chamber and to said workpiece contained therein;

(e) a means for confining said pressure produced by said expansion to said first and said second chambers;

(f) a means for controlling the pressure of said first and second chambers;

(g) a means for controlling the temperature of said workpiece.

* * * * *